Figure 1:
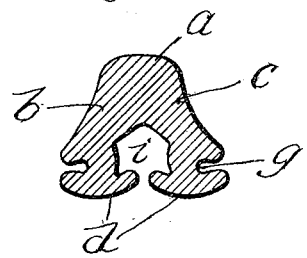

M. METTLER.
ELASTIC WHEEL TIRE.
APPLICATION FILED FEB. 12, 1915.

1,169,984.

Patented Feb. 1, 1916.

Witnesses:-
Thelma Crump
Benjamin Newcomb

Inventor:-
Max Mettler
by Carl H. Crawford
Attorney

UNITED STATES PATENT OFFICE.

MAX METTLER, OF LEIPZIG, GERMANY.

ELASTIC WHEEL-TIRE.

1,169,984.  Specification of Letters Patent.  Patented Feb. 1, 1916.

Application filed February 12, 1915. Serial No. 7,693.

*To all whom it may concern:*

Be it known that I, MAX METTLER, a subject of the German Emperor, and a resident of Leipzig, in the Kingdom of Saxony, Germany, have invented new and useful Improvements in Elastic Wheel-Tires, of which the following is a specification.

At present pneumatic tires are mostly employed for cycles and automobiles, as with this kind of tires the contact surface of the tire with the road can be materially reduced if the air tube is sufficiently inflated, and furthermore the tire can be applied to the wheel in such a manner, that an unevenness of the road does not cause any appreciable vibration of the vehicle. However these advantages are balanced by a series of material drawbacks, which consist mainly in that with the slightest injury of the air tube a further traveling of the vehicle is impossible and the damage caused by the injury of the air tube can be removed only in a troublesome manner. To obviate these drawbacks, it has been proposed, to employ instead of the air tube, an elastic filling material, as for instance: cork, sponge-rubber or the like. However these expedients have not resulted satisfactorily, as first on account of the continuous friction and the heat to which the filling material is subjected the latter is soon converted into such a condition, that its elasticity is lost and the arch of the tread flattens, so that the contact surface is materially increased, and the distance between tread and rim is so reduced that the elastic filling loses its effectiveness.

According to my invention a tire of rubber or rubber like material is employed, which consists of a thick walled head or tread portion provided at both sides with equally thick walled shank portions, the latter inclosing a hollow space, which is open at its lower side. The shank portions terminate in foot like projections, which are inserted between the bead edges of the rim, similar to the shoes of pneumatic tires; these foot like projections have such a shape, that they contact only with the bead edges of the rim, but are freely suspended above the body portion of the rim.

The proportions of my improved tire can be selected so that on a completely smooth road the rubber layer is able to carry the load, without being appreciably compressed. If however the road is rough, the central recess or groove of the tire enables the same first to expand correspondingly in width and secondly to enter farther into the wheel rim. After the roughness of the road is passed the tire returns to its normal position.

The foot portions of the tire shanks are preferably shaped in such a manner, that, when the tire is inserted into the rim, their inner edges contact with each other and thereby lock each other in connection with the rim. This effect can be increased by providing a filling material consisting of a fiber substance or any other elastic material, which, when the tire is inserted into the rim, is compressed in such a manner, that it tends to press the shank portions at both sides of the tire against the bead edges of the rim.

Figure 2:
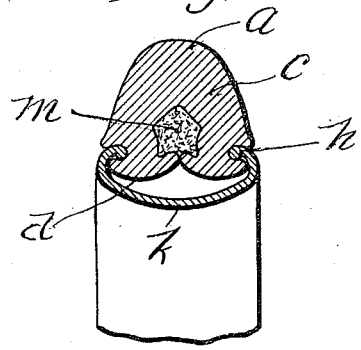

In the accompanying drawing, in which one form of construction is illustrated by way of example; Figure 1 shows the cross section of my improved tire, while Fig. 2 shows the cross section of the tire after its insertion into the rim.

From the preferably narrow head portion $a$ of the tire are projecting downwardly slightly inclined, thick walled shank portions $b$, which terminate in the foot portions $d$. The grooves $g$, provided between the shank portions $b$ and the foot portions $d$ engage in the usual manner with the edges $h$ of the wheel rim $k$.

When the tire is to be inserted into the rim, the foot portions are strongly pressed against each other, so that they are partly bent downwardly, and thereby produce the compression necessary to safely hold the tire within the rim.

As already mentioned before, it is preferable, to provide a filling material $m$ in the hollow space $i$ between the shank portions $b$, said filling material consisting of a fiber substance or any other suitable elastic filling substance.

What I claim as new and desire to secure by Letters Patent of the United States is:

1. In combination, a circumferentially concave wheel rim provided with inwardly extending bead edges overhanging lateral body portions of the rim, and a tire having a solid thick tread and being divided by a circumferentially disposed cavity extending radially outwardly from the inner periphery of said tire toward said tread to form annular shanks, each shank having an annular bead cavity for engagement with said bead edges and said shanks being normally spread apart in spaced relation with their outer edges defining a greater dimension than the distance between said bead edges thereby causing the radially inward or lower ends of said shanks to extend radially outwardly from their normal positions and in spaced relation with respect to the body of said rim when said shanks are sprung toward each other for insertion of said rim edges into said annular bead cavities, such movement of said shanks toward each other serving to arch the tread of said tire, substantially as described.

2. In combination, a wheel rim provided with inwardly extending bead edges, and a solid tire having a relatively thick tread and being centrally divided by a circumferentially disposed cavity opening to the interior periphery of said tire and dividing the latter into oppositely disposed shanks, the outer edges of said shanks having cavities for engagement with said bead edges, and said shanks being normally spaced apart from each other and defining a greater transverse dimension than the distance between said bead edges thereby causing the inner portions of said shanks to extend radially outwardly when said shanks are brought into abutting relation for insertion of said bead edges into said cavities, such compression of said shanks toward each other serving to arch said tread, substantially as described.

3. In combination a wheel rim provided with bead edges, a solid tire having a relatively thick tread and being divided by a cavity extending radially inwardly and circumferentially from the inner peripheries of said tire to form oppositely disposed shanks, said shanks having annular grooves for engagement with said bead edges, and a resilient filling disposed in said cavity between said shanks and normally acting to spread said shanks apart from each other to define a dimension greater than the distance between said bead edges, thereby causing compression of said filling when said shanks are brought into engagement with each other to spring the shanks into connection with said bead edges, substantially as described.

Signed at Leipzig, Saxony, Germany, this 12th day of January, 1915.

MAX METTLER.

In the presence of—
RICHARD CLAUSS,
RUDOLPH FRICKE.

Copies of this patent may be obtained for five cents each, by addressing the "Commissioner of Patents Washington, D. C."